Feb. 4, 1936.  F. A. TALBOT  2,029,345
COMBINED FILLING CLOSURE AND GAUGE ROD
Filed Oct. 19, 1933    2 Sheets-Sheet 1
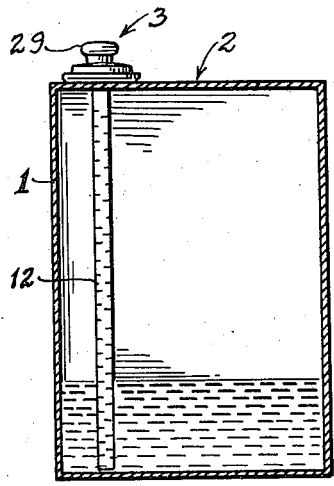
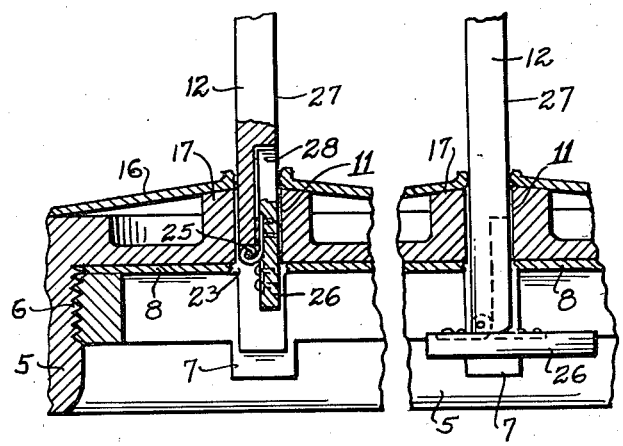
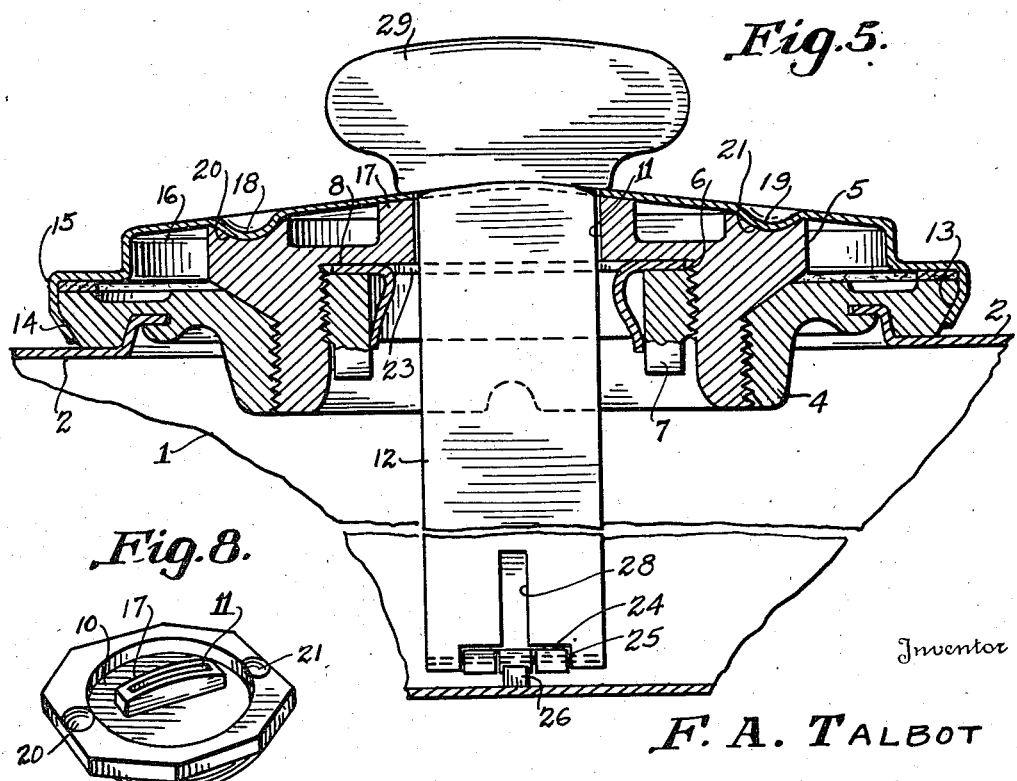
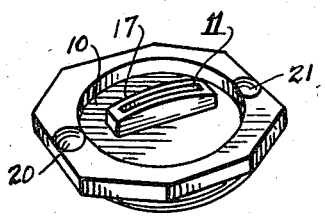
Inventor
F. A. TALBOT
By Mason Fenwick Lawrence
Attorneys Feb. 4, 1936. F. A. TALBOT 2,029,345
COMBINED FILLING CLOSURE AND GAUGE ROD
Filed Oct. 19, 1933 2 Sheets—Sheet 2
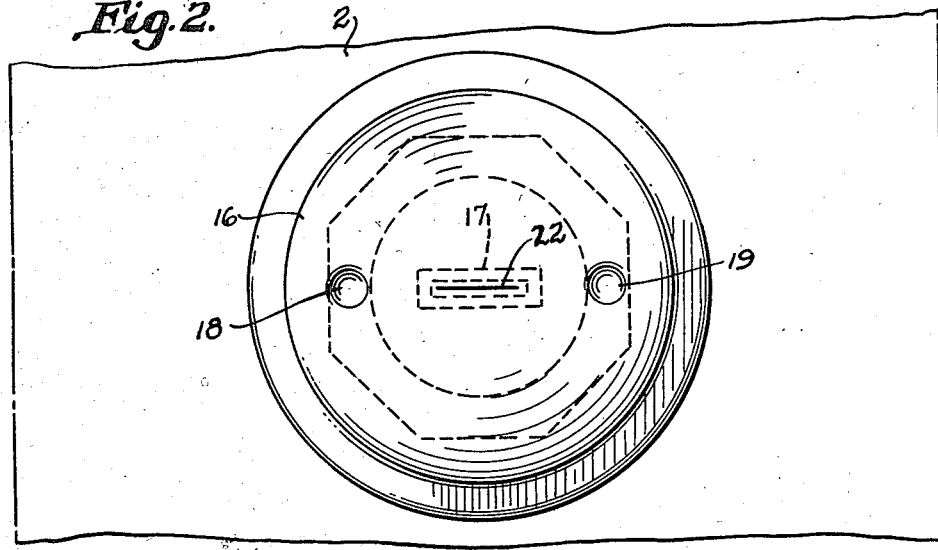
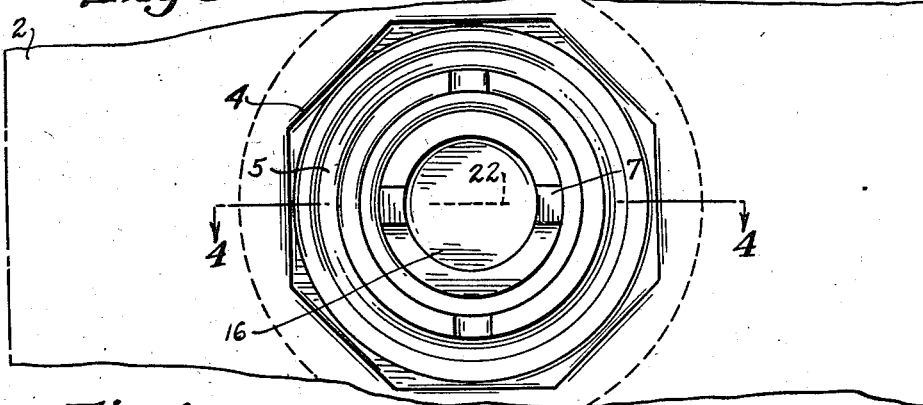
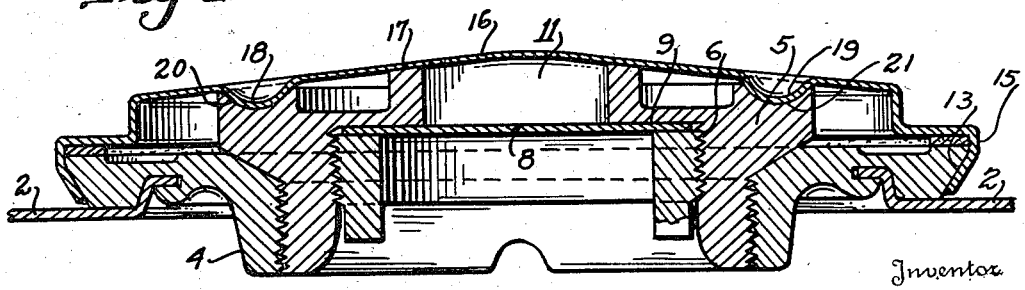
Inventor
F. A. TALBOT
By Mason Fenwick & Lawrence
Attorneys Patented Feb. 4, 1936

2,029,345

UNITED STATES PATENT OFFICE 2,029,345

COMBINED FILLING CLOSURE AND GAUGE ROD

Frank A. Talbot, Baltimore, Md., assignor to Quaker State Oil Refining Co., a corporation of Pennsylvania Application October 19, 1933, Serial No. 694,356

13 Claims. (Cl. 220—86)

The invention forming the subject matter of this application is a combined sealed filling closure and gauge rod, particularly adapted for use in liquid dispensing tanks.

As is well known in the oil industries, oil companies selling high grade nationally advertised brands of oil and gasoline are subjected to great losses in business and in good will through the practice of unscrupulous dealers of adding inferior oils and gasolines to the companies' tanks, and selling these inferior products, as those of highly reputable companies. To guard against the losses entailed in this practice, the companies would naturally lock the apertures to their tanks were it not for the fact that it is necessary, from time to time, to measure the quantity of liquid in the tanks. This measurement is effected usually by inserting a gauge rod through the filling neck of the container so that, ordinarily, if the closure on the filling neck were locked, it would be impossible for the operator to gauge the contents of the tank.

It is the object of the present invention to provide tanks with filling closures which are sealed after filling of the tanks at the refineries, and which are designed to have a gauge rod inserted through the sealed closure without mutilating the seal more than is necessary to insert the gauge rod.

It is another object of the invention to utilize the gauge rod as a permanent closure for the sealed filling neck after the gauge rod has once been inserted through the sealed neck. This function is effected by using a particular type of gauge rod which may be inserted through a suitable opening in the seal and closure plug, but which, after insertion through the said seal and plug, cannot be withdrawn completely from the tank and through the plug without further mutilating the seal and without showing that the tank has been unlawfully tampered with.

Other objects of the invention will become apparent as the detailed description thereof proceeds.

In the drawings:

Figure 1 illustrates diagrammatically an oil tank or drum provided with the sealed filling neck and gauge rod forming parts of this invention;

Figure 2 is a fragmentary top lan view of part of the tank with the sealed filling neck applied thereto, but before the insertion of the gauge rod.

Figure 3 is a fragmentary bottom plan view of a wall of the tank, with the filling neck applied thereto;

Figure 4 is a vertical transverse section taken on the line 4—4 of Figure 3, the scale of the drawing being somewhat enlarged;

Figure 5 is a section similar to Figure 4 but showing a gauge rod passed through the sealed filling neck, and having the parts of the rod in position to prevent complete withdrawal through said neck;

Figure 6 is a fragmentary vertical section through part of the filling neck showing the method of inserting the gauge rod therethrough;

Figure 7 is a fragmentary side elevation of the gauge rod taken at right angles to the view shown in Figure 6, and illustrating the locking part of said gauge rod; and Figure 8 is a perspective view of the closure plug of the filling neck designed to receive said gauge rod.

As shown in the drawings, a tank 1 has the top 2 thereof provided with a filling neck which is adapted to be sealed after filling of the tank at the refinery, and which is adapted to receive a special type of gauge rod after the tank has been forwarded to the dealer and is in position for dispensing purposes. The filling neck designated generally by the reference numeral 3 comprises a bung fitting 4 adapted to be secured in any suitable manner to the top 2. This bung fitting 4 is internally screwthreaded to receive a closure plug 5 which is externally screwthreaded to correspond with the internal screwthreads of the fitting 4.

The plug 5 is provided with a countersink 6 internally screwthreaded to receive an externally screwthreaded ring 7 designed to clamp a thin sheet 8 of tin, or similar material, against a shoulder 9 formed in the aforesaid plug 5 by the countersink 6. The plug 5 has its top wall 10 provided with a slot 11 of substantially the same cross sectional area as the gauge rod 12, which is designed to be inserted through the aforesaid slot 11.

The outer periphery of the fitting 4 is beveled inwardly, as shown by the reference numeral 13 in Figures 4 and 5 of the drawings. This beveled part 13 is designed to receive the lower pressed-in part 14 of a skirt 15 depending from the main body part of a seal 16 of thin sheet metal; which is permanently secured to the fitting 4, and through the bung fitting 4 to the top 2, after the container has been filled. The filling plug 5 has a reinforcing projection 17 extending around the slot 11. The upper edge of this projection 17 is curved so as to form a solid seat for a central part of the seal 16.

The thin plate 8 serves to take the weight of the liquid in the tank during the shipment thereof and to prevent the entire weight of the oil or other liquid resting on the seal 16 in the event of the tank being turned upside down. It is obviously undesirable to have this seal 16 form the sole closure means for the aforesaid slotted plug. The plate 8 is positively clamped in position by the ring 7 and is of sufficient thickness to withstand any pressure that might be imposed thereon during the shipment of the filled tanks.

The seal 16 is designed to seat in a predetermined position on the closure plug 5. This predetermined positioning is secured by providing the seal with two depressions 18 and 19, adapted to seat in corresponding depressions 20 and 21, respectively, formed in the filling plug 5. It will be evident from the drawings that when the seal 16 is properly seated on the filling plug 5 its central part will have a predetermined position relative to the slot 11 formed in the filling plug. In order that a slot for the gauge rod might be positioned properly over the slot 11, the seal 16 is marked on its outer surface with a short line 22 directly over the rectangular slot 11. This line 22 serves to indicate the position of a slot to be cut in seal 16, and registering with the slot 11, to receive the gauge rod 12.

The slot 11 is designed to receive with close sliding fit the gauge rod 12. Before inserting this rod, however, it will be necessary to punch through a slot 23 in the sheet 8. This may be readily performed by any tool of substantially the same cross sectional dimensions as the gauge rod 12. It will be obvious that by punching such a tool through the slot 11, it will cut a registering slot 23 in the sheet 8. To prevent unauthorized filling through the slots 11 and 23, the gauge rod 12 is passed through these slots; and as previously stated, fits snugly but slidably therein.

It is the object of the present invention to form the gauge rod so that it can not be withdrawn from the tank after its insertion through the filling plug. In order to effect this function, the lower end of the gauge rod 12 is provided with a transverse recess 24 adapted to receive the knuckle 25 of a hinge to which is secured a lock bar 26. The arrangement of hinge and bar is such that the bar may be seated flush with the face 27 of the gauge rod 12 in a recess 28 formed in the face 27. It will be observed from Figures 6 and 7 that the knuckle of the hinge is offset to one side of the locking bar 26 so that when the gauge rod and bar are pushed through the slots 11 and 23 the bar 26 of its own weight will fall into the position shown in Figure 7 of the drawings; in which position, it is evident that the gauge rod can not be removed without removing the seal 16 and the filling plug 5 along with it. In that event the removal of the seal 16 will show that the tank has been unlawfully opened.

The gauge rod 12 may have any suitable scale formed thereon, or may take any of the well known forms, in which openings or ridges are arranged to hold films of liquid and thereby indicate the depth of liquid in the tank or container. The upper end of the rod is provided with a knob 29 having its lower end shaped to fit the curvature of the seal, so that when the rod is in its lowest position the filling plug slots 11 and 23 will be properly closed against the entrance of atmospheric air, dust, etc.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. A tank, a filling neck fixed thereon, a closure plug detachably connected to said neck, a seal covering said neck and plug, said seal and plug being provided with registering slots to receive a gauge rod.

2. The apparatus set forth in claim 1 in combination with a gauge rod slidably mounted in said slots, and means on said rod to limit its sliding movements in said slots in both directions.

3. The apparatus set forth in claim 1, in combination with a gauge rod slidably mounted in said slots, and a locking bar pivoted to one end of said rod and adapted to extend across the rod to prevent removal of the rod from said plug and filling neck.

4. A tank, a filling neck fixed thereon, a closure plug detachably secured to said neck and having a slot extending therethrough, a seal covering said filling neck and plug and permanently secured to said filling neck, said seal and filling plug being provided with registering slots, a gauge rod of substantially the same cross sectional area as said slots and slidably mounted in said slots, and means pivotally connected to one end of said rod to prevent withdrawal of the rod from said plug and seal.

5. A tank, a filling neck fixed thereon, a closure plug detachably connected to said neck, a sheet of material forming a seal covering said neck and plug and fixed to said neck, said seal and plug being provided with registering slots, a gauge rod slidably mounted in said slots, one end of said rod having a recess formed therein, a locking bar pivotally mounted in said recess and adapted to lie flush with one face of said rod during the passage of the rod in one direction through said slots, said bar being pivoted to move by gravity across the rod to prevent removal of the rod from the filling neck and plug.

6. A tank, a filling neck permanently secured to said tank, a closure plug detachably connected to said filling neck, said plug having a slot therethrough, a diaphragm extending across the slot of said filling plug, means for clamping said diaphragm in position to close said plug, and a seal of sheet material extending over the outside of said plug and around the filling neck.

7. A tank, a filling neck fixed thereto, a closure plug detachably connected to said filling neck and having a slot extending therethrough, a clamping ring fitting in said plug, a sheet of thin material extending across the slot of said plug and held in slot closing position by said ring, and a sheet of material covering the outer face of said plug and neck and fixedly secured to said neck.

8. A tank, a filling neck secured thereto, a closure plug detachably connected to said filling neck and having a slot therethrough, a sheet of material encasing said filling neck and plug and having a part thereof inscribed to register with the slot of said plug, and a diaphragm of sheet material clamped across the inner face of said plug to close the slot thereof.

9. A tank, a filling neck secured thereto, a closure plug detachably connected to said filling neck and having a slot therethrough, said plug being provided on its face with a pair of recesses, a sheet of material extending over said plug and filling neck and having depressions adapted to seat in said recesses, said sheet forming a seal for said filling neck and plug and fixedly secured to said filling neck, said sheet having a line inscribed thereon to indicate the position in which a slot may be formed therethrough to register with the slot in said plug.

10. A tank, a filling neck fixed thereon, a closure plug detachably connected to said neck and having a slot therethrough and a pair of recesses formed in a face thereof, a seal formed of sheet material having depressions seated in said recesses and having a slot therethrough registering with the slot of said plug.

11. The combination set forth in claim 10 with a diaphragm extending across the inner face of said closure plug, and means for clamping the diaphragm in slot closing position therein.

12. A tank, a filling neck secured to said tank, a closure plug having a slot therethrough, a seal encasing said filling neck and plug and having a slot registering with the slot in said plug, a diaphragm extending across the inner face of said plug and having a slot registering with the slot of said plug, a gauge rod extending slidably through the said registering slots, and means on said gauge rod to prevent withdrawal of the same through said slots after having been passed therethrough.

13. A container having an opening, a closure plug fitting in said opening, an external seal covering said plug, said seal and plug being provided with registering slots to receive a gauge rod.

FRANK A. TALBOT.